United States Patent
Cheng et al.

(10) Patent No.: US 10,672,029 B2
(45) Date of Patent: **\*Jun. 2, 2020**

(54) CLUSTERING USERS OF A SOCIAL NETWORKING SYSTEM BASED ON USER INTERACTIONS WITH CONTENT ITEMS ASSOCIATED WITH A TOPIC

(71) Applicant: Facebook, Inc., Menlo Park, CA (US)

(72) Inventors: Haibin Cheng, San Jose, CA (US); Sue Ann Hong, San Francisco, CA (US); Xingyao Ye, Mountain View, CA (US)

(73) Assignee: FACEBOOK, INC., Menlo Park, CA (US)

( \* ) Notice: Subject to any disclaimer, the term of this patent is extended or adjusted under 35 U.S.C. 154(b) by 406 days.

This patent is subject to a terminal disclaimer.

(21) Appl. No.: 14/719,780

(22) Filed: May 22, 2015

(65) Prior Publication Data

US 2016/0343027 A1 Nov. 24, 2016

(51) Int. Cl.
*G06Q 30/02* (2012.01)
*H04L 12/18* (2006.01)
*G06Q 50/00* (2012.01)

(52) U.S. Cl.
CPC ..... *G06Q 30/0254* (2013.01); *G06Q 30/0251* (2013.01); *G06Q 30/0255* (2013.01); *G06Q 30/0277* (2013.01); *G06Q 50/01* (2013.01); *H04L 12/18* (2013.01); *H04L 12/185* (2013.01); *H04L 12/1859* (2013.01)

(58) Field of Classification Search
CPC .......... G06Q 30/0254; G06Q 30/0277; G06Q 30/0251; G06Q 30/0255; G06F 16/9535; H04L 12/185; H04L 12/1859
See application file for complete search history.

(56) References Cited

U.S. PATENT DOCUMENTS

| | | | |
|---|---|---|---|
| 2004/0019523 A1\* | 1/2004 | Barry | G06Q 30/02 705/14.73 |
| 2009/0234713 A1\* | 9/2009 | Bi | G06Q 30/02 705/14.54 |

(Continued)

OTHER PUBLICATIONS

Coffey, "Internet Audience Measurement: A Practitioner's View," Journal of Interactive Advertising, vol. 1, No. 2, Spring 2001, 8 pages. (Year: 2001).\*

*Primary Examiner* — Raquel Alvarez (57) ABSTRACT

A social networking system presents users with a content items and ad requests, which may include targeting criteria specifying a topic. Interactions by users who were presented with an advertisement from an ad request including targeting criteria specifying the topic are stored by the social networking system and used to identify a cluster group of additional users having characteristics similar to characteristics of users who were presented with the advertisement from the ad request including targeting criteria specifying the topic and who interacted with the advertisement. The social networking system determines scores for additional users in the cluster group based on measures of similarity between the additional users and the users who were presented with the advertisement and who interacted with the advertisement. Based on the determined scores, the social networking system associates additional users in the cluster group with the topic.

20 Claims, 3 Drawing Sheets

(56) References Cited

U.S. PATENT DOCUMENTS

| | | | |
|---|---|---|---|
| 2010/0217646 A1* | 8/2010 | Siegel | G06Q 10/1093 705/7.18 |
| 2011/0167486 A1* | 7/2011 | Ayloo | G06Q 10/00 726/7 |
| 2011/0196733 A1* | 8/2011 | Li | G06Q 30/0243 705/14.42 |
| 2012/0102520 A1* | 4/2012 | Motzel | H04N 21/2743 725/30 |
| 2012/0116864 A1* | 5/2012 | Jalili | G06Q 30/02 705/14.35 |
| 2012/0296455 A1* | 11/2012 | Ohnemus | G06F 19/322 700/91 |
| 2014/0272900 A1* | 9/2014 | Mellett | G09B 7/06 434/353 |
| 2015/0012350 A1* | 1/2015 | Li | G06Q 30/0243 705/14.42 |
| 2015/0081725 A1* | 3/2015 | Ogawa | G06Q 50/01 707/754 |
| 2016/0092576 A1* | 3/2016 | Quercia | G06F 16/9535 707/734 |
| 2016/0277351 A1* | 9/2016 | Wang | H04L 51/32 |
| 2016/0300262 A1* | 10/2016 | Gao | G06Q 30/0269 |
| 2017/0070570 A1* | 3/2017 | Jalili | H04L 67/02 |
| 2017/0169466 A1* | 6/2017 | Balasubramanian | G06Q 30/0251 |
| 2019/0207894 A1* | 7/2019 | Kumar | H04L 51/18 |

* cited by examiner

CLUSTERING USERS OF A SOCIAL NETWORKING SYSTEM BASED ON USER INTERACTIONS WITH CONTENT ITEMS ASSOCIATED WITH A TOPIC

BACKGROUND

This disclosure relates generally to selecting content for presentation to online system users and more particularly to targeting content for presentation to groups of users of an online system.

Traditionally, providers of content have attempted to tailor content presented to users based on expected demographics of users. Even before the advent of broadcast media, a business providing a product sought to purchase space for content describing or promoting that product in a publication read by typical consumers of the product. As publishing and broadcasting costs fell, more media catered to niche audiences, allowing content providers to more finely tune presentation of content to narrower groups of media consumers. Nonetheless, content presented in various media mainly cater to the typical consumer of the media in which the content is presented, causing atypical consumers of media to encounter content that is irrelevant to the atypical consumers. With the advent of personalized digital media, content may be matched to an individual user according to known traits of the user. However, producers of personalized digital media often have limited information about a user, so a content provider may miss opportunities to present a user with content relevant to the user because the content provider lacks explicit user information indicating that the user has characteristics placing the user in an audience of users to receive content from the content provider.

SUMMARY

A social networking system presents users with a variety of advertisements and content items. An advertisement is included in an advertisement request ("ad request") including a bid amount specifying a maximum amount of compensation an advertiser associated with the ad request will provide the social networking system for presenting the advertisement. Additionally, the ad request may include targeting criteria associated with the advertisement and identifying characteristics of users eligible to be presented with the advertisement. For example, targeting criteria user profile information, connections to other users, or actions, and users having characteristics satisfying at least a threshold number of the targeting criteria in an ad request are eligible to be presented with the advertisement in the ad request. Including targeting criteria in an ad request allows an advertiser or other content provider to identify users having specific characteristics, simplifying subsequent distribution of content to different users. Targeting criteria included in an ad request may include a topic that identifies a subject or theme of content. Examples of topics include everyday items such as "coffee," or "chocolate ice cream," activities such as "skating," or "hunting," or any other subject about which content may be presented.

To select content for presentation to a user, the social networking system identifies users of the social networking system who have interacted with advertisements from one or more ad requests associated with a topic. The social networking system may identify various ad requests including targeting criteria specifying the topic and identifies the advertisements associated included in the identified ad requests. After identifying the ad requests, the social networking system retrieves stored interactions with advertisements from the identified ad requests and identifies users who performed the retrieved interactions. In some embodiments, the social networking system retrieves actions by users with the advertisements from the identified ad requests including the topic in targeting criteria that occurred within a specified time interval (e.g., within a threshold time interval from a current time, within a specific time interval).

Based on characteristics of the identified users, the social networking system identifies a cluster group that includes additional users having characteristics matching or similar to characteristics of the identified users. In various embodiments, the social networking system trains a model based on characteristics of the identified users and applies the trained model to other users of the social networking system. Based on application of the model, the social networking system identifies additional users for inclusion in the cluster group. For example, application of the model to characteristics of a user generates a value based on similarity between characteristics of the user and characteristics of the identified users; if the value for the user equals or exceeds a threshold value, the social networking system includes the user in the cluster group.

Additionally, the social networking system determines a score for users in the cluster group. A score associated a user of the cluster group provides a measure of similarity between the user of the cluster group and the identified users. In some embodiments, the measure of similarity used to determine the score represents an affinity of a user in the cluster group for content associated with the cluster group, a likelihood of a user in the cluster group interacting with advertisements with which the identified users previously interacted, or a similarity in tastes, preferences, actions, or interests between a user in the cluster group and the identified users. The social networking system may train and apply a scoring model to characteristics of users in the cluster group to determine the scores associated with the users in the cluster group. In some embodiments, the scoring model also accounts for characteristics of the identified users.

Based at least in part on the scores associated with users in the cluster group, the social networking system selects users from the cluster group. In one example, the social networking system ranks users in the cluster group based on their associated scores and selects users in the cluster group having at least a threshold position in the ranking. As another example, the social networking system selects users in the cluster group associated with scores equaling or exceeding a threshold value. In another embodiment, the social networking system identifies a number of topics associated with each user, and selects users in the cluster group based on the number of topics associated with each user and the determined score associated with each user. For example, the social networking system selects users from the cluster group having at least a threshold score and also associated with less than a threshold number of topics. The social networking system identifies the selected users from the cluster group as associated with the topic associated with the ad request including the advertisement with which the identified users interacted. Identifying the selected users as associated with the topic associated with the ad request including the advertisement with which the identified users interacted allows the social networking system to identify additional content associated with the topic as eligible for presentation to the selected users, increasing the amount of content available for presentation to the selected users with which the selected users are likely to interact.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
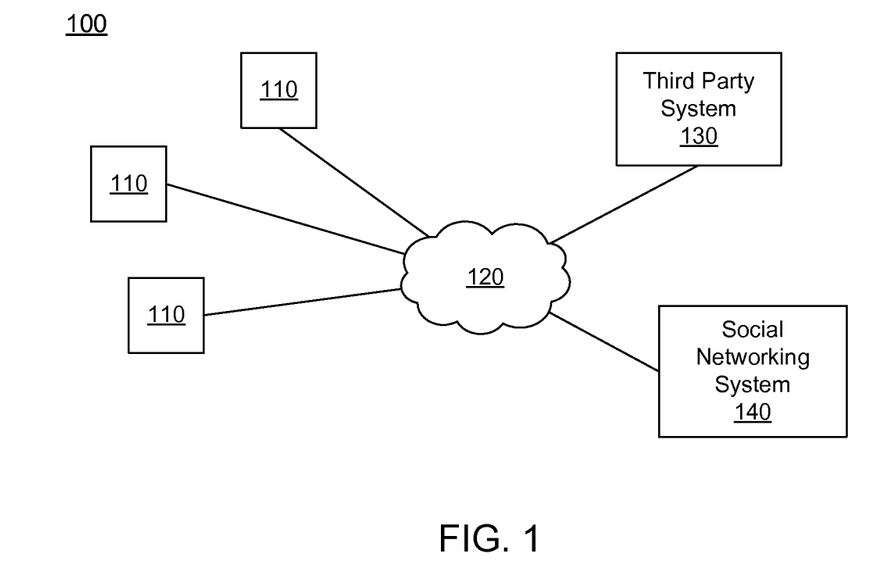
FIG. 1 is a block diagram of a system environment in which a social networking system operates, in accordance with an embodiment.

FIG. 1 is a block diagram of a system environment 100 for a social networking system 140. The system environment 100 shown by FIG. 1 comprises one or more client devices 110, a network 120, one or more third-party systems 130, and the social networking system 140. In alternative configurations, different and/or additional components may be included in the system environment 100. The embodiments described herein can be adapted to online systems other than social networking systems.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the social networking system 140. For example, a client device 110 executes a browser application to enable interaction between the client device 110 and the social networking system 140 via the network 120. In another embodiment, a client device 110 interacts with the social networking system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the social networking system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the social networking system 140, such as advertisements, content, information describing a group of users of the social networking system 140, or information about an application provided by the third party system 130. In some embodiments, a third party system 130 may communicate information directly to the social networking system 140.

Figure 2:
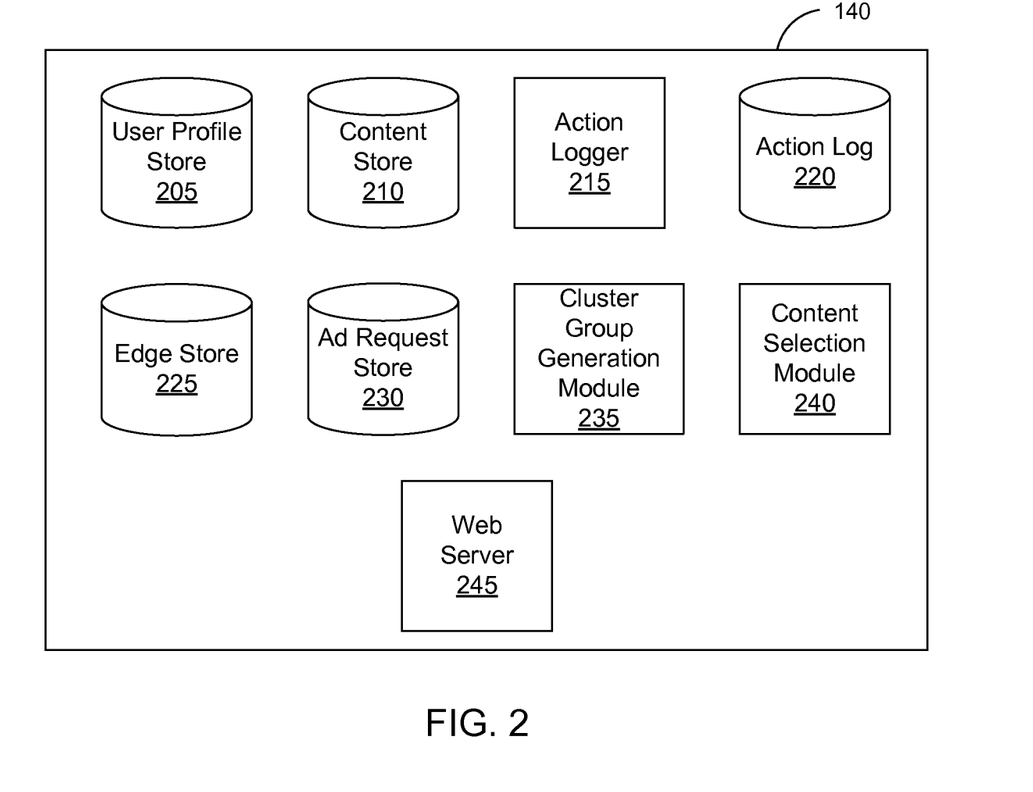
FIG. 2 is a block diagram of a social networking system, in accordance with an embodiment.

FIG. 2 is a block diagram of an architecture of the social networking system 140. The social networking system 140 shown in FIG. 2 includes a user profile store 205, a content store 210, an action logger 215, an action log 220, an edge store 225, an advertisement request ("ad request") store 230, a cluster group generation module 235, a content selection module 240 and a web server 245. In other embodiments, the social networking system 140 may include additional, fewer, or different components for various applications. Conventional components such as network interfaces, security functions, load balancers, failover servers, management and network operations consoles, and the like are not shown so as to not obscure the details of the system architecture.

Each user of the social networking system 140 is associated with a user profile, which is stored in the user profile store 205. A user profile includes declarative information about the user that was explicitly shared by the user and may also include profile information inferred by the social networking system 140. In one embodiment, a user profile includes multiple data fields, each describing one or more attributes of the corresponding social networking system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the social networking system users displayed in an image, with information identifying the images in which a user is tagged stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the social networking system 140, user profiles may also be stored for entities such as businesses or organizations. This allows an entity to establish a presence on the social networking system 140 for connecting and exchanging content with other social networking system users. The entity may post information about itself, about its products or provide other information to users of the social networking system 140 using a brand page associated with the entity's user profile. Other users of the social networking system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Social networking system users may create objects stored by the content store 210, such as status updates, photos tagged by users to be associated with other objects in the social networking system 140, events, groups or applications. In some embodiments, objects are received from third-party applications or third-party applications separate from the social networking system 140. In one embodiment, objects in the content store 210 represent single pieces of content, or content "items." Hence, social networking system users are encouraged to communicate with each other by posting text and content items of various types of media to the social networking system 140 through various communication channels. This increases the amount of interaction of users with each other and increases the frequency with which users interact within the social networking system 140.

The action logger 215 receives communications about user actions internal to and/or external to the social networking system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the social networking system 140 to track user actions on the social networking system 140, as well as actions on third party systems 130 that communicate information to the social networking system 140. Users may interact with various objects on the social networking system 140, and information describing these interactions is stored in the action log 220. Examples of interactions with objects include: commenting on posts, sharing links, and checking-in to physical locations via a client device 110, accessing content items, and any other suitable interactions. Additional examples of interactions with objects on the social networking system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the social networking system 140 as well as with other applications operating on the social networking system 140. In some embodiments, data from the action log 220 is used to infer user characteristics of a user (e.g., interests or preferences), augmenting the user characteristics included in the user's user profile and allowing a more complete understanding of user preferences and characteristics.

The action log 220 may also store user actions taken on a third party system 130, such as an external website, and communicated to the social networking system 140. For example, an e-commerce website may recognize a user of a social networking system 140 through a social plug-in enabling the e-commerce website to identify the user of the social networking system 140. Because users of the social networking system 140 are uniquely identifiable, e-commerce websites, such as in the preceding example, may communicate information about a user's actions outside of the social networking system 100 to the social networking system 140 for association with the user. Hence, the action log 220 may record information about actions users perform on a third party system 220, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the social networking system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 140, such as expressing interest in a page on the social networking system 140, sharing a link with other users of the social networking system 140, and commenting on posts made by other users of the social networking system 140.

In one embodiment, an edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the social networking system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the social networking system 140 over time to approximate a user's interest in an object or in another user in the social networking system 140 based on the actions performed by the user. A user's affinity may be computed by the social networking system 140 over time to approximate the user's interest in an object, in a topic, or in another user in the social networking system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

One or more advertisement requests ("ad requests") are included in the ad request store 230. An advertisement request includes advertisement content and a bid amount. The advertisement content is text, image, audio, video, or any other suitable data presented to a user. In various embodiments, the advertisement content also includes a landing page specifying a network address to which a user is directed when the advertisement is accessed. The bid amount is associated with an ad request by an advertiser and is used to determine an expected value, such as monetary compensation, provided by an advertiser to the social networking system 140 if advertisement content in the ad request is presented to a user, if the advertisement content in the ad request receives a user interaction when presented, or if any suitable condition is satisfied when advertisement content in the ad request is presented to a user. For example, the bid amount specifies a monetary amount that the social networking system 140 receives from the advertiser if advertisement content in an ad request is displayed. In some embodiments, the expected value to the social networking system 140 of presenting the advertisement content may be determined by multiplying the bid amount by a probability of the advertisement content being accessed by a user.

Additionally, an advertisement request may include one or more targeting criteria specified by the advertiser. Targeting criteria included in an advertisement request specify one or more characteristics of users eligible to be presented with advertisement content in the advertisement request. For example, targeting criteria are used to identify users having user profile information, edges, or actions satisfying at least one of the targeting criteria. Hence, targeting criteria allow an advertiser to identify users having specific characteristics, simplifying subsequent distribution of content to different users.

In one embodiment, targeting criteria may specify actions or types of connections between a user and another user or object of the social networking system 140. Targeting criteria may also specify interactions between a user and objects performed external to the social networking system 140, such as on a third party system 130. For example, targeting criteria identifies users that have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows advertisers to further refine users eligible to be presented with advertisement content from an advertisement request. As another example, targeting criteria identifies users having a connection to another user or object or having a particular type of connection to another user or object.

Targeting criteria may specify a topic, which refers to a subject or a theme associated with content. Examples of topics include everyday items such as "coffee," or "chocolate ice cream," activities such as "skating," or "hunting," or any other subject describing content. Including one or more topics in targeting criteria allows an advertiser to further refine users eligible to be presented with advertisement content from an advertisement request or to identify users more likely to interact with advertisement content from an advertisement request. This allows advertisers to specifically target content to users who have previously interacted with content associated with a topic or who have indicated an interest in the topic, which may increase the likelihood of the users interacting with the content targeted by the advertisers.

The cluster group generation module 235 identifies cluster groups associated with various topics. A cluster group associated with a topic includes social networking system users having at least a threshold affinity for content associated with the topic. In some embodiments, the cluster group generation module 235 identifies a topic and identifies users who have previously interacted with content items associated with the topic. The cluster group generation module 235 may identify users who interacted with content items associated with an identified topic within a specific time interval (e.g., within a specific time interval from a current time, within a specific range of dates and/or times). Based on the identified users, the cluster group generation module 235 identifies additional users having at least a threshold measure of similarity to the identified users who interacted with content items associated with a topic for inclusion in the cluster group associated with the topic. As further described below in conjunction with FIG. 3, the cluster group generation 235 module determines measures of similarity between additional users and the identified users based on characteristics of the additional users and characteristics of the additional users.

For additional users in the cluster group, the cluster group generation module 235 determines a score for users in the cluster group. A score associated an additional user in the cluster group also provides a measure of similarity between the additional user in the cluster group and the identified users. In some embodiments, the measure of similarity used to determine the score represents an affinity of an additional user in the cluster group for content associated with the cluster group, a likelihood of the additional user in the cluster group interacting with advertisements with which the identified users previously interacted, or a similarity in tastes, preferences, actions, or interests between the additional user in the cluster group and the identified users. The cluster group generation module 235 may train and apply a scoring model to characteristics of additional users in the cluster group to determine the scores associated with the users in the cluster group. In some embodiments, the scoring model also accounts for characteristics of the identified users. Generation of scores associated with additional users in the cluster group is further described below in conjunction with FIG. 3. Based on the scores associated with additional users in the cluster group, the cluster group identification module 235 selects additional users from the cluster group to associate with the topic, as further described below in conjunction with FIG. 3. Additional users identified as associated with the topic are eligible to be presented with additional content items associated with the topic.

The content selection module 240 selects one or more content items for communication to a client device 110 to be presented to a user. Content items eligible for presentation to the user are retrieved from the content store 210, from the ad request store 230, or from another source by the content selection module 240, which selects one or more of the content items for presentation to the viewing user. A content item eligible for presentation to the user is a content item associated with at least a threshold number of targeting criteria satisfied by characteristics of the user or is a content item that is not associated with targeting criteria. When identifying content items eligible for presentation to a user, the content selection module 240 accounts for topics associated with the user by the cluster group generation module 235 when comparing characteristics of the user to targeting criteria included in content items or ad requests. In various embodiments, the content selection module 240 includes content items eligible for presentation to the user in one or more selection processes, which identify a set of content items for presentation to the viewing user. For example, the content selection module 240 determines measures of relevance of various content items to the user based on characteristics associated with the user by the social networking system 140 and based on the user's affinity for different content items. Based on the measures of relevance, the content selection module 240 selects content items for presentation to the user. As an additional example, the content selection module 240 selects content items having the highest measures of relevance or having at least a threshold measure of relevance for presentation to the user. Alternatively, the content selection module 240 ranks content items based on their associated measures of relevance and selects content items having the highest positions in the ranking or having at least a threshold position in the ranking for presentation to the user.

Content items eligible for presentation to the user may include ad requests or other content items associated with bid amounts. The content selection module 240 uses the bid amounts associated with ad requests when selecting content for presentation to the viewing user. In various embodiments, the content selection module 240 determines an expected value associated with various ad requests (or other content items) based on their bid amounts and selects content items associated with a maximum expected value or associated with at least a threshold expected value for presentation. An expected value associated with an ad request or with a content item represents an expected amount of compensation to the social networking system 140 for presenting an ad request or a content item. For example, the expected value associated with an ad request is a product of the ad request's bid amount and a likelihood of the user interacting with the ad content from the ad request. The content selection module 240 may rank ad requests based on their associated bid amounts and select ad requests having at least a threshold position in the ranking for presentation to the user. In some embodiments, the content selection module 240 ranks both content items not associated with bid amounts and ad requests in a unified ranking based on bid amounts associated with ad requests and measures of relevance associated with content items and ad requests. Based on the unified ranking, the content selection module 240 selects content for presentation to the user. Selecting ad requests and other content items through a unified ranking is further described in U.S. patent application Ser. No. 13/545,266, filed on Jul. 10, 2012, which is hereby incorporated by reference in its entirety.

For example, the content selection module 240 receives a request to present a feed of content to a user of the social networking system 140. The feed may include one or more advertisements as well as content items, such as stories describing actions associated with other online system users connected to the user. The content selection module 240 accesses one or more of the user profile store 205, the content store 210, the action log 220, the edge store 225, and the cluster group generation module 235 to retrieve information about the user. For example, information describing actions associated with other users connected to the user or other data associated with users connected to the user are retrieved. Additionally, one or more advertisement requests ("ad requests") may be retrieved from the ad request store 230. The retrieved stories, ad requests, or other content items, are analyzed by the content selection module 240 to identify candidate content items, including ad requests, eligible for presentation to the user. For example, content items associated with users who not connected to the user or stories associated with users for whom the user has less than a threshold affinity are discarded as candidate content items. Based on various criteria, the content selection module 240 selects one or more of the content items or ad requests identified as candidate content for presentation to the identified user. The selected content items or ad requests are included in a feed of content that is presented to the user. For example, the feed of content includes at least a threshold number of content items describing actions associated with users connected to the user via the social networking system 140.

In various embodiments, the content selection module 240 presents content to a user through a feed including a plurality of content items selected for presentation to the user. One or more advertisements may also be included in the feed. The content selection module 240 may also determine the order in which selected content items or advertisements are presented via the feed. For example, the content selection module 240 orders content items or advertisements in the feed based on likelihoods of the user interacting with various content items or advertisements.

The web server 245 links the social networking system 140 via the network 120 to the one or more client devices 110, as well as to the one or more third party systems 130. In some embodiments, the web server 245 links the social networking system 140 directly ton one or more third party systems 130. The web server 245 serves web pages, as well as other content, such as JAVA®, FLASH®, XML and so forth. The web server 245 may receive and route messages between the social networking system 140 and the client device 110, for example, instant messages, queued messages (e.g., email), text messages, short message service (SMS) messages, or messages sent using any other suitable messaging technique. A user may send a request to the web server 245 to upload information (e.g., images or videos) that are stored in the content store 210. Additionally, the web server 250 may provide application programming interface (API) functionality to send data directly to native client device operating systems, such as IOS®, ANDROID™, WEBOS® or BlackberryOS.

Identifying a Cluster Group Associated with a Topic

Figure 3:
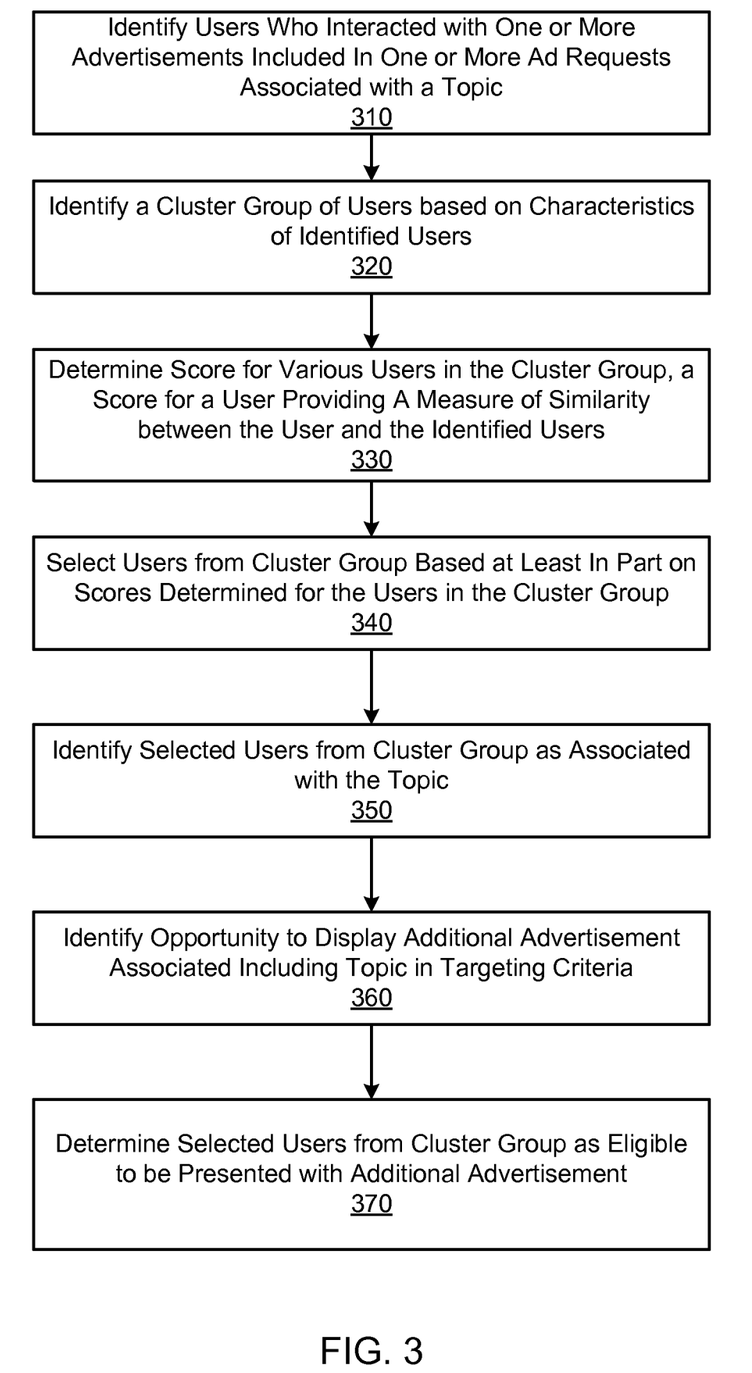
FIG. 3 is a flow chart of a method for identifying a cluster group of users of the social networking system, in accordance with an embodiment.

FIG. 3 is a flowchart of one embodiment of a method for identifying a cluster group of users of the social networking system 140. In other embodiments, the method may include different and/or additional steps than those described in conjunction with FIG. 3. Additionally, in some embodiments, the method may perform the steps described in conjunction with FIG. 3 in different orders.

The social networking system 140 presents users with a variety of advertisements included in ad requests and other content items. Various ad requests and content items are associated with topics. A topic associated with a content item or with an ad request identifies a subject described by the content item or the ad request. In some embodiments, an ad request or a content item includes targeting criteria that specifies characteristics of social networking system users eligible to be presented with the ad request or the content item. Targeting criteria may identify a topic, so the social networking system 140 associates a content item or an ad request with the topic included in the targeting criteria. Different users may interact with content items or advertisements from ad requests associated with different topics, so identifying topics associated with ad requests or content items with which a user interacted allows the social networking system 140 to select content for presentation to the user with which the user is more likely to interact.

Based on interactions with advertisements from ad requests or with content items presented to users that are stored by the social networking system 140, the social networking system 140 identifies 310 users who have interacted with advertisements from one or more ad requests associated with the topic or with content items associated with a topic. For example, the social networking system 140 identifies 310 users who were presented with an advertisement included in an ad request including a specific topic as targeting criteria and who performed one or more specific interactions with the advertisement included in the ad request (e.g., expressed a preference for the advertisement, shared the advertisement with another user, accessed content associated with the advertisement, accessed content associated with the advertisement, etc.). In some embodiments, the social networking system 140 identifies 310 users who interacted with advertisements from ad requests or with content items associated with the topic within a specified time interval. Additionally, the social networking system 140 may identify 310 users who performed a specific interaction (e.g., commented on, shared) with advertisements included in ad requests associated with the topic or with content items associated with the topic or who performed a specific interaction with ad requests or content items within a specified time interval. For example, the social networking system 140 identifies ad requests or content items associated with the topic and identifies 310 users who interacted with advertisements included in the identified ad requests or with content items based on information stored by the social networking system 140 describing interactions associated with the identified ad requests and users associated with the interactions.

The social networking system 140 identifies 320 a cluster group of users associated with the topic based on the characteristics of the identified users. As described above in conjunction with FIG. 2, a cluster group associated with the topic includes additional users having at least a threshold measure of similarity to one or more users who interacted with a content item associated with the topic or with an advertisement included in an ad request associated with the topic. For example, the cluster group associated with the topic includes additional users having at least a threshold number or percentage of characteristics matching or similar to characteristics of users who interacted with an advertisement included in an ad request associated with the topic or with a content item associated with the topic. In some embodiments, the social networking system 140 identifies 320 additional users having at least a threshold number or percentage of interests matching interests specified by at least a threshold number of users who interacted with advertisements included in ad requests associated with the topic or with content items associated with the topic. Similarly, the social networking system 140 may identify 320 additional users who interacted with content items or advertisements from ad requests having at least a threshold number or percentage of characteristics matching characteristics of content items with which the users interacted or ad requests associated with the topic and including advertisements with which the users interacted. The social networking system 140 may train and apply a model to characteristics of the users who interacted with content items associated with the topic or with advertisements included in ad requests associated with the topic, characteristics of additional users, characteristics of content items with which the users interacted or advertisements included in ad requests with which the users interacted, and/or characteristics of content items with which the user interacted or characteristics of ad requests including advertisements with which the additional users interacted to generate values associated with the additional users. Based on the values associated with additional users, the social networking system 140 identifies 320 additional users included in the cluster group. For example, additional users associated with values equaling or exceeding a threshold are identified 320 as included in the cluster group. The value associated with an additional user provides a measure of similarity between the additional user and the users who interacted with content items associated with the topic or with advertisements included in ad requests associated with the topic. In some embodiments, the model includes a set of model parameters determined by training a machine learning algorithm based on characteristics of users who interacted with ad requests or content items associated with the topic. The cluster group may include both the users who interacted with ad requests or content items and the identified additional users in some embodiments.

Based on characteristics of the additional users in the cluster group, the social networking system 140 determines 330 scores for the various additional users in the cluster group. A score for an additional user in the cluster group is based on a measure of similarity between the additional user and users who interacted with an ad request or a content item associated with the topic associated with the cluster group. In some embodiments, the score for an additional user is the value associated with the additional user by the social networking system 140 when identifying 320 additional users for inclusion in the cluster group. Alternatively, in other embodiments, the score for an additional user may provide a measure of the additional user's affinity for content associated with the topic associated with cluster group, a likelihood of the additional user interacting with content items previously interacted with by the users or with advertisements included in ad requests previously interacted with by the users, or a measure of similarity of characteristics of the additional user and characteristics (e.g., interests, actions, demographic information) of the users who interacted with the advertisements included in ad requests associated with the topic associated with the cluster group or interacted with content items associated with the topic associated with the cluster group. The social networking system 140 may train and apply a scoring model to characteristics of an additional user in the cluster group and characteristics of the users who interacted with advertisements included in ad requests associated with the topic associated with the cluster group or with content items associated with the topic associated with the cluster group to determine a score for the additional user. In one embodiment, the model includes a set of model parameters determined by training a machine learning algorithm based on characteristics of users who interacted with ad requests or content items associated with the topic. An example of determining 330 a score associated with users in the cluster group is further described in U.S. patent application Ser. No. 14/290,355, filed on May 29, 2014 which is hereby incorporated by reference in its entirety.

Based at least in part on the scores for the additional users in the cluster group, the social networking system 140 selects 340 users from the cluster group. In some embodiments, the social networking system 140 selects 340 at least a threshold number or percentage of the additional users in the cluster group. For example, the social networking system 140 ranks the additional users in the cluster group based on the scores for the additional users, and selects 340 additional users having at least a threshold position in the ranking. The threshold position in the ranking may correspond to the threshold number of additional users or may be determined based on a number of additional users in the target group and a threshold percentage of the additional users. Alternatively, the social networking system 140 selects 340 additional users from the cluster group associated with scores equaling or exceeding a threshold score; the threshold score may be determined based on scores associated with various additional users and a threshold percentage of the additional users so a number of additional users equaling or exceeding the threshold percentage is selected 340.

In another example, the social networking system 140 identifies a number of topics associated with each additional user in the cluster group and selects 340 additional users from the cluster group based on scores associated with additional users in the cluster group and numbers of topics associated with additional users in the cluster group. For example, the social networking system 140 selects 340 additional users from the cluster group having a score equaling or exceeding a threshold score and associated with less than a threshold number of topics. In some embodiments, the social networking system 140 may select 340 additional users based on a combination of the scores associated with additional users and the number of topics associated with additional users. For example, the social networking system 140 selects 340 an additional user associated with less than a threshold number of topics if the score associated with the additional user exceeds a threshold score.

The social networking system 140 identifies 350 the selected additional users from the cluster group as being associated with the topic associated with the cluster group. For example, the social networking system 140 includes information identifying the topic in user profiles associated with the selected additional users or stores information associating user identifiers of the selected additional users with the topic. Identifying 350 the selected additional users as being associated with the topic allows the social networking system 140 to identify the selected additional users as eligible to be presented with additional content items or ad requests that include the topic in targeting criteria. This allows the social networking system 140 to increase the number of users who may be presented with content items or ad requests including the topic in targeting criteria to include users who have not explicitly associated themselves with the topic. Identifying additional users based on similarity between the additional users and users who interacted with content items or ad requests associated with a topic increases the likelihood of the additional users also interacting with subsequently presented content items or ad requests including the topic in targeting criteria.

After identifying 350 the selected additional users from the cluster group as associated with the topic, the social networking system 140 identifies 360 an opportunity to present content items, including one or more advertisements to a selected additional user. The social networking system 140 determines 370 the selected additional user is eligible to be presented with advertisements included in ad requests that include the topic in targeting criteria or content items that include the topic in targeting criteria and have at least a threshold number of targeting criteria satisfied by characteristics of the selected additional user. For example, the social networking system 140 receives a request for content from a client device 110 associated with the selected additional user and selects candidate content to evaluate for presentation to the selected additional user that includes content items having targeting criteria including the topic or advertisements included in ad requests having targeting criteria including the topic. Content items and/or ad requests eligible for presentation to the selected additional user, which may include content items or ad requests having targeting criteria identifying the topic, are included in one or more selection processes, as described above in conjunction with FIG. 2, which select content for presentation to the selected additional user. For example, the social networking system 140 includes an advertisement request having targeting criteria identifying the topic in a selection process along with other ad requests eligible for presentation to the selected additional user. Based at least in part on bid amounts associated with the ad requests, the social networking system 140 selects advertisements included in one or more ad requests for presentation to the selected additional user.

Cluster Group Including a Subset of Users of the Social Networking System

Figure 4:
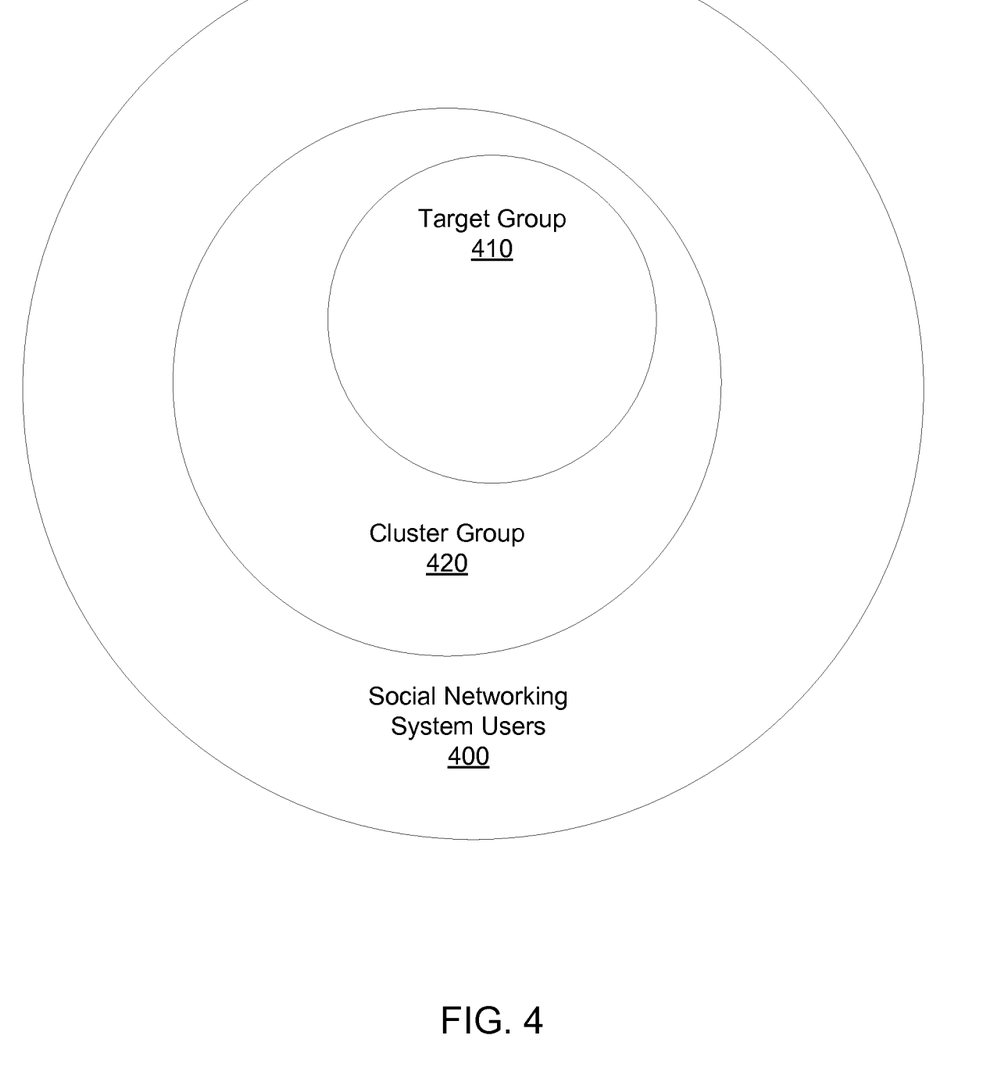
FIG. 4 is a diagram illustrating a cluster group of the users of the social networking system, in accordance with an embodiment.

FIG. 4 is a diagram of an example cluster group including social networking system users. The social networking system 140 includes a plurality of users 400 who are presented with content, which includes ad requests, by the social networking system 140. Various users interact with different content items and advertisements included in ad requests selected for presentation to the users by the social networking system 140. A subset of the users 400 who interacted with one or more advertisements included in ad requests including targeting criteria specifying a specific topic or with content items including targeting criteria identifying the specific topic are included in a target group 410. Hence, the target group 410 includes users associated with the specific topic and who have interacted with advertisements included in ad requests including targeting criteria identifying the specific topic or with content items presented to the users that include targeting criteria identifying the specific topic. Stored actions associated with users and characteristics of users maintained by the social networking system 140 may be used to identify the target group 410 in various embodiments.

As described above in conjunction with FIG. 3, the social networking system 140 identifies a cluster group 420 of users associated with the specific topic based at least in part on characteristics of users in the target group 410. In one embodiment, the cluster group 420 includes a subset of the plurality of users 400 who have at least a threshold measure of similarity to users in the target group 410, as described above in conjunction with FIG. 3. For example, the social networking system 140 applies a trained model to characteristics of users in the target group 410 and to characteristics of users from the plurality of users 400 to generate a value and includes users associated with at least a threshold value in the cluster group 420.

As described above in conjunction with FIG. 3, the social networking system 140 determines scores for users in the cluster group 420 based at least in part on measures of similarity between users in the cluster group 420 and users in the target group 410. Based on the scores, the social networking system 140 identifies users from the cluster group 420 as associated with the specific topic associated with ad requests including advertisements with which users in the target group 410 interacted or with content items with which users in the target group 410 interacted. Hence, users from the cluster group 420 identified as associated with the specific topic are subsequently identified as having a characteristic satisfying targeting criteria identifying the specific topic, so content items or ad requests including the specific topic in targeting criteria may be eligible for presentation to the users identified from the cluster group 420. Accordingly, the social networking system 140 includes users in the cluster group 420 having at least a threshold measure of similarity to users who previously interacted with content items that included the specific topic in their targeting criteria or with advertisements included in ad requests that included the specific topic in their targeting criteria.

SUMMARY

The foregoing description of embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of embodiments is intended to be illustrative, but not limiting, of the scope of the patent rights, which is set forth in the following claims.

What is claimed is:

1. A computer-implemented method comprising:
identifying users of a social networking system who have previously interacted with an advertisement included in an advertisement request ("ad request"), the ad request including a topic in targeting criteria, the topic identifying a subject or theme of content;
identifying one or more characteristics associated with each of the users who were presented with and who have previously interacted with the advertisement included in the ad request including the topic in the targeting criteria;
training a machine learning model based on the identified one or more characteristics associated with each of the users who have previously interacted with the advertisement;
identifying a cluster group including additional users having at least a threshold measure of similarity to one or more of the identified users who have previously interacted with the advertisement included in the ad request including the topic in the target criteria based at least in part on characteristics of the additional users and the identified one or more characteristics associated with the users who were presented with and who have previously interacted with the advertisement included in the ad request including the topic in the targeting criteria;
determining a score for each of the additional users included in the cluster group using the machine learning model, the score for an additional user in the cluster group based at least in part on a measure of a similarity between the additional user in the cluster group and the identified users;
selecting one or more additional users from the cluster group based at least in part on the determined scores;
identifying an opportunity to display an additional advertisement based on an additional ad request including the topic as a targeting criteria;
in response to the additional ad request including the topic as a targeting criteria, identifying the selected one or more additional users from the cluster group as eligible to be presented with the additional advertisement;
receiving a request to present the additional advertisement to the selected one or more additional users from the cluster group; and displaying the additional advertisement to the selected one or more additional users via interfaces of one or more client devices associated with the one or more additional users.

2. The method of claim 1, wherein identifying users of the social networking system who have previously interacted with the advertisement included in the ad request including the topic in the targeting criteria comprises:
identifying users who were presented with the advertisement included in the ad request and who performed one or more specified actions with the advertisement included in the ad request.

3. The method of claim 2, wherein the one or more specified actions are selected from a group consisting of: sharing the advertisement included in the ad request with another user, accessing the ad request, accessing content associated with the advertisement included in the ad request, interacting with an application associated with the advertisement included in the ad request, expressing a preference for the advertisement included in the ad request, and any combination thereof.

4. The method of claim 1, wherein identifying users of the social networking system who have previously interacted with the advertisement included in the ad request including the topic in the targeting criteria comprises:
identifying users who were presented with the advertisement included in the ad request and who performed one or more actions with the advertisement included in the ad request within a specified time.

5. The method of claim 1, wherein identifying the cluster group including additional users having at least the threshold measure of similarity to one or more of the identified users comprises:
identifying additional users having at least a threshold number of characteristics matching characteristics of an identified user as included in the cluster group.

6. The method of claim 1, wherein identifying the cluster group including additional users having at least the threshold measure of similarity to one or more of the identified users comprises:
identifying additional users having at least a threshold percentage of characteristics matching characteristics of an identified user as included in the cluster group.

7. The method of claim 1, wherein identifying the cluster group including additional users having at least the threshold measure of similarity to one or more of the identified users comprises:
identifying additional users who interacted with advertisements included in additional ad requests having at least a threshold percentage of characteristics matching characteristics of ad requests with which at least a threshold number of the identified users interacted as included in the cluster group.

8. The method of claim 1, wherein identifying the cluster group including additional users having at least the threshold measure of similarity to one or more of the identified users comprises:
applying the machine learning model to characteristics of an additional user and to characteristics of one or more of the identified users; and
determining whether to include the additional user in the cluster group based at least in part on application of the machine learning model.

9. The method of claim 8, wherein the machine learning model includes a set of model parameters determined based at least in part on characteristics of the identified users.

10. The method of claim 1, wherein determining the score for each of the additional users included in the cluster group comprises:
applying the machine learning model to characteristics of the additional user included in the cluster group and to characteristics of one or more of the identified users; and
determining the score for the additional user included in the cluster group based on application of the machine learning model.

11. The method of claim 10, wherein the machine learning model includes a set of model parameters determined based at least in part on characteristics of the identified users.

12. The method of claim 1, further comprising:
identifying an opportunity to present one or more additional advertisements included in additional advertisement requests to a selected additional user;
identifying one or more additional ad requests including the topic in the targeting criteria as eligible for presentation to the selected additional user; and
including the identified one or more additional ad requests in one or more selection processes for identifying content to present to the selected additional user.

13. The method of claim 1, wherein selecting one or more additional users from the cluster group based at least in part on the determined scores comprises:
ranking the additional users in the cluster group based at least in part on the determined scores; and
selecting additional users having at least a threshold position in the ranking.

14. A computer program product comprising a computer-readable storage medium having instructions encoded thereon that, when executed by a processor, cause the processor to:
identify users of a social networking system who have previously interacted with an advertisement included in an advertisement request ("ad request"), the ad request including a topic in targeting criteria, the topic identifying a subject or theme of content;
identify one or more characteristics associated with each of the users who were presented with and who have previously interacted with the advertisement included in the ad request including the topic in the targeting criteria;
train a machine learning model based on the identified one or more characteristics associated with each of the users who have previously interacted with the advertisement;
identify a cluster group including additional users having at least a threshold measure of similarity to one or more of the identified users who have previously interacted with the advertisement included in the ad request including the topic in the target criteria based at least in part on characteristics of the additional users and the identified one or more characteristics associated with each of the users who were presented with and who have previously interacted with the advertisement included in the ad request including the topic in the targeting criteria;
determine a score for each of the additional users included in the cluster group using the machine learning model, the score for an additional user in the cluster group based at least in part on a measure of a similarity between the additional user in the cluster group and the identified users;
select one or more additional users from the cluster group based at least in part on the determined scores;

identify an opportunity to display an additional advertisement based on an additional ad request including the topic as a targeting criteria;

in response to the additional ad request including the topic as a targeting criteria, identify the selected one or more additional users from the cluster group as eligible to be presented with the additional advertisement;

receive a request to present the additional advertisement to the selected one or more additional users from the cluster group; and displaying the additional advertisement to the selected one or more additional users via interfaces of one or more client devices associated with the one or more additional users.

15. The computer program product of claim 14, wherein identifying users of the social networking system who have previously interacted with the advertisement included in the ad request including the topic in the targeting criteria comprises:

identifying users who were presented with the advertisement included in the ad request and who performed one or more specified actions with the advertisement included in the ad request.

16. The computer program product of claim 15, wherein identifying users of the social networking system who have previously interacted with the advertisement included in the ad request including the topic in the targeting criteria comprises:

identifying users who were presented with the advertisement included in the ad request and who performed one or more actions with the advertisement included in the ad request within a specified time.

17. The computer program product of claim 15, wherein determining the score for each of the additional users included in the cluster group comprises:

applying a model to characteristics of the additional user included in the cluster group and to characteristics of one or more of the identified users; and determining the score for the additional user included in the cluster group based on application of the model.

18. The computer program product of claim 17, wherein the model includes a set of model parameters determined based at least in part on characteristics of the identified users.

19. The computer program product of claim 15, wherein the computer readable storage medium further has instructions encoded thereon that, when executed by the processor, cause the processor to:

identify an opportunity to present one or more additional advertisements included in additional advertisement requests to a selected additional user;

identify one or more additional ad requests including the topic in the targeting criteria as eligible for presentation to the selected additional user; and include the identified one or more additional ad requests in one or more selection processes for identifying content to present to the selected additional user.

20. The computer program product of claim 15, wherein selecting one or more additional users from the cluster group based at least in part on the determined scores comprises:

ranking the additional users in the cluster group based at least in part on the determine scores; and selecting additional users having at least a threshold position in the ranking.

* * * * *